Sept. 5, 1961 M. A. USAB 2,998,805
REMOTE CONTROL VALVE OPERATOR
Filed April 24, 1958 2 Sheets-Sheet 1
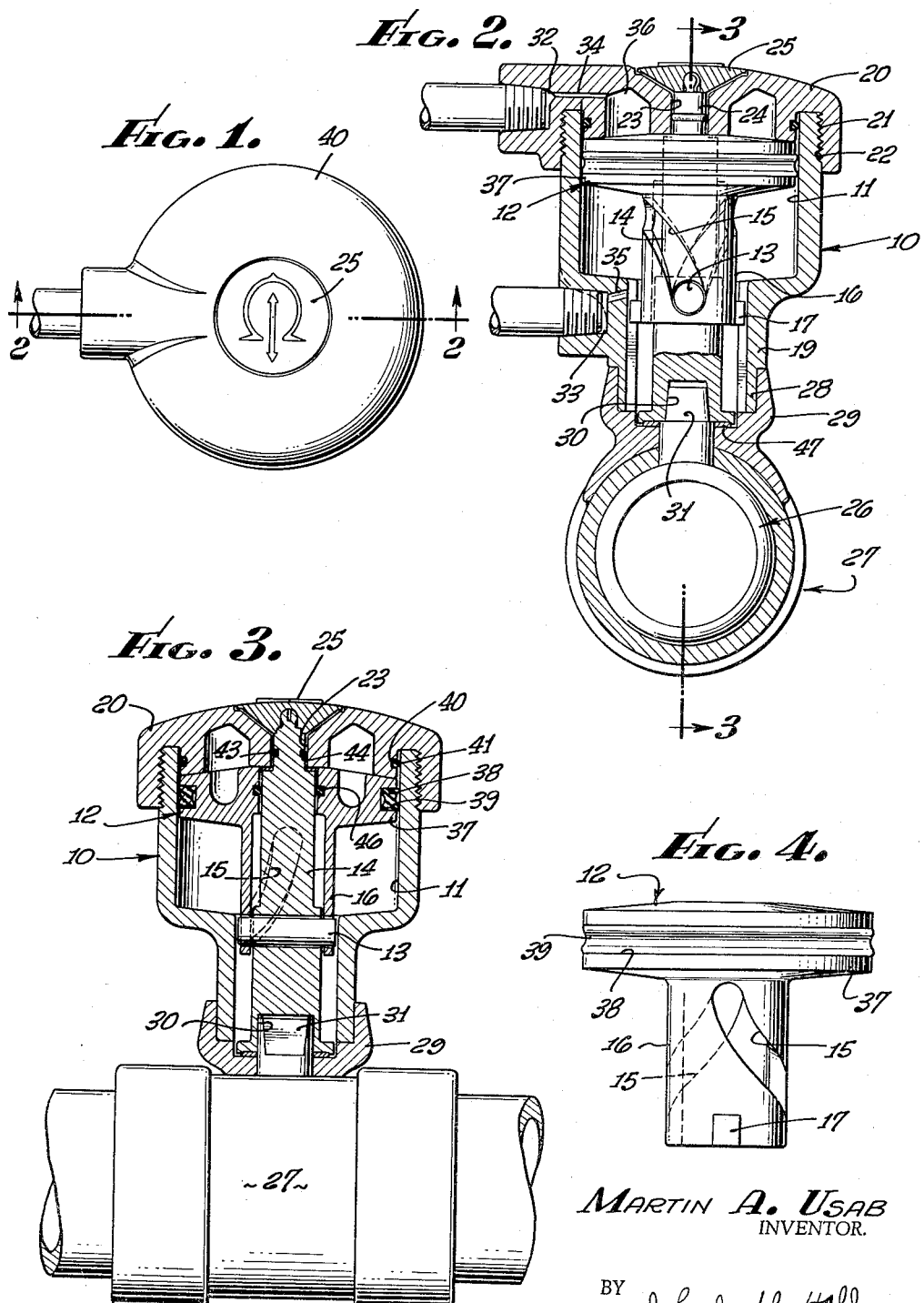
MARTIN A. USAB
INVENTOR.
BY John Joseph Hall
ATTORNEY.

Sept. 5, 1961 M. A. USAB 2,998,805
REMOTE CONTROL VALVE OPERATOR
Filed April 24, 1958 2 Sheets-Sheet 2
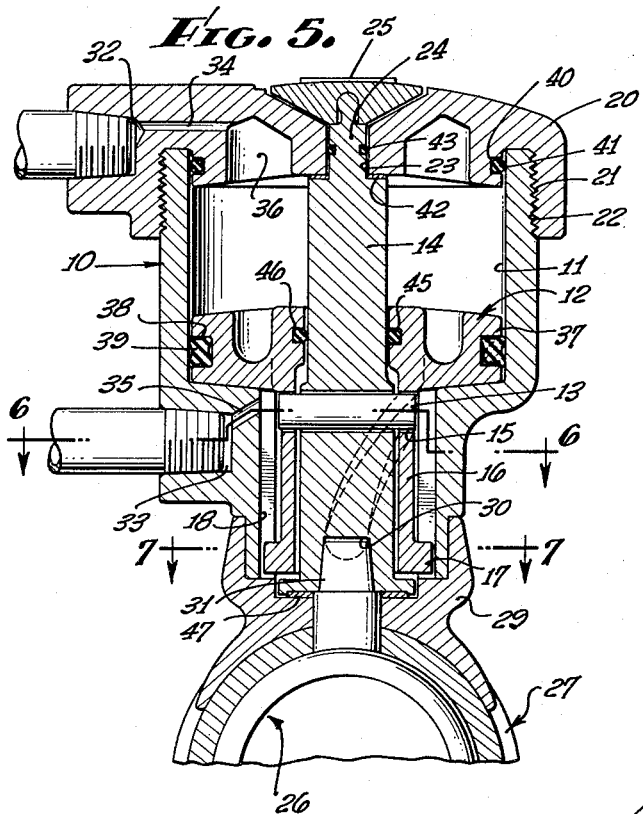
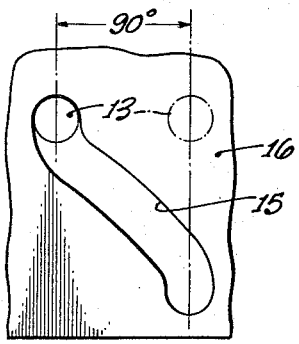
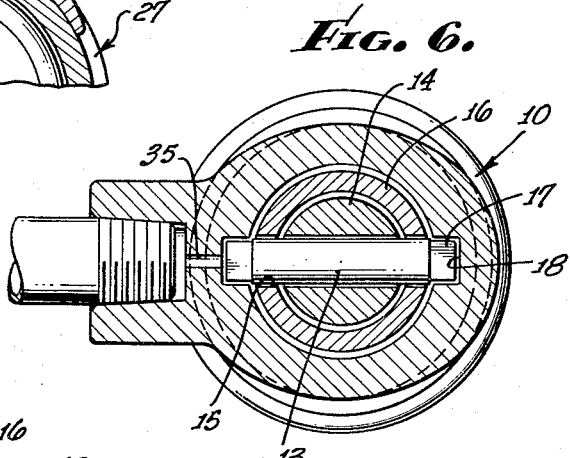
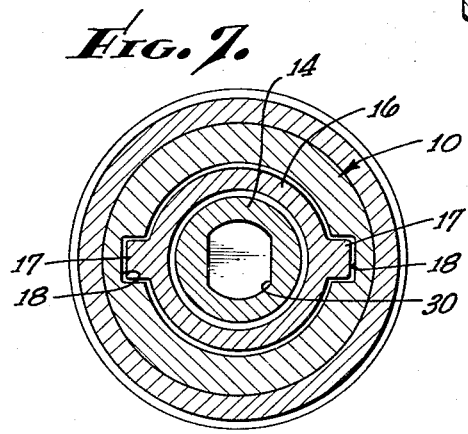
MARTIN A. USAB
INVENTOR.
BY John Joseph Hall
ATTORNEY.

2,998,805
Patented Sept. 5, 1961

1

2,998,805
REMOTE CONTROL VALVE OPERATOR
Martin A. Usab, Costa Mesa, Calif., assignor, by mesne assignments, to Consolidated Thermoplastics Company, Stamford, Conn., a corporation of Delaware
Filed Apr. 24, 1958, Ser. No. 730,649
1 Claim. (Cl. 121—119)

This invention relates to the design and improvements in valve operators, particularly with reference to a remote control valve operator of the piston type.

It is an object of my invention to provide a valve operator having a simple turning movement incorporated with the piston without the use of linkages.

It is another object of my invention to provide a valve operator which can be easily assembled and disassembled without the need of any tools or special equipment.

A further object of my invention is to provide a valve operator which is capable of being produced by extremely inexpensive manufacturing methods.

These and other objects will be more readily understood by reference to the following description and claim, taken in conjunction with the accompanying drawing forming a part hereof, in which FIGURE 1 is a plan view of the valve operator.

FIGURE 2 is an elevation of a section taken along line 2—2 of FIGURE 1, showing the piston in the up position.

FIGURE 3 is a section along line 3—3 of FIGURE 2.

FIGURE 4 is an elevation view of the piston showing the cam slot arrangement.

FIGURE 5 is a section similar to FIGURE 2 but showing the piston in the extreme down position.

FIGURE 6 is a cross section along line 6—6 of FIGURE 5.

FIGURE 7 is a cross section along line 7—7 of FIGURE 5.

FIGURE 8 is a developed view of the cam slot of the piston.

The body 10 of the valve operator contains a chamber 11 to house the operator piston 12. The stem pin 13 of the stem 14 rides in the cam slots 15 cut into the piston cylinder 16. The lower end of the piston cylinder 16 is formed into a key 17 cooperating with key slots 18 in the lower walls 19 of the operator body 10.

The operator body 10 is closed at its upper end by a cap nut 20 having threads 21 on its inside diameter meshing with corresponding threads 22 on the upper end of the operator body 10. The cap nut 20 contains an opening 23 to accommodate the upper end 24 of the stem 14 which is adapted to receive an indicator 25 which shows the position of the valve plug 26 in the valve 27 controlled by the operator.

The lower portion 28 of the operator body 10 fits into an adaptor member 29 which joins the operator to the body of the valve 27 controlled by the operator. The lower end of the operator stem 14 is formed into a stem socket 30 adapted to receive the stem 31 of the valve 27 controlled by the operator, thus providing a rigid stem to stem connection.

Pressure inlet openings 32 and 33 are provided in the operator body 10 for introducing fluid material, pneumatic or hydraulic, to change the position of the piston. The orifices 34 and 35 connect the pressure inlet openings with the interior of the operator body 10. The connection is made directly in the lower portion of the operator body 10 and by means of the annular opening 36 in the cap nut 20.

To prevent leakage of fluid material, the head 37 of the piston 12 is provided with grooves 38 adapted to receive seals 39 of the O-ring or other type seal.

2

Similarly, grooves 40 also adapted to receive seals 41 of the O-ring or other type seal are cut into the cap nut to prevent such leakage. Leakage of fluid material from the cap nut opening 23 is prevented by an upper washer 42 and by O-ring or other type seals 43 inserted in grooves 44 in the upper end of the operator stem 14. Leakage from the piston head is prevented by grooves 45 in which are inserted O-ring or other type seals 46. A lower washer 47 prevents leakage out of the bottom of the operator stem 14.

In the operation of the device, after the valve operator has been connected to the valve desired to be controlled, fluid pressure, hydraulic or pneumatic, is introduced into a pressure inlet opening. This pressure causes the piston to move up or down, as the case may be. As the piston moves, the stem pin 13, riding in the cam slots 15 of the piston cylinder 16, transmits to the stem 14 the movement of the piston by a cam follower action to produce a rotary movement of the operator stem 14, which in turn rotates the stem 31 of the valve 27 controlled by the operator. Reversing the direction of the fluid pressure instantly reverses the piston, thus producing a reverse rotary movement of the operator stem 14 and thus of the valve stem 31.

While I have described my invention in detail with reference to the accompanying drawings illustrating the preferred form of my invention, it is understood that numerous changes in the details of construction and arrangement of parts may be made without departing from the spirit and scope of the invention as described and hereinafter claimed.

I claim:

In a valve operator for mounting on a valve unit to actuate the rotating stem of a valve, the combination of: a body having an enclosed cylinder cavity and a guide cavity with a common axis, said body having axially spaced fluid inlet passages communicating with said cylinder cavity adjacent the top and bottom respectively of said cylindrical cavity; a shaft mounted in said body for rotation about said axis relative to said body, said shaft having a first cylindrical portion positioned within said cylinder cavity and a second cylindrical portion extending into said guide cavity; and a piston slidably positioned on said shaft within said cylindrical cavity for movement along said axis, said piston having a cam sleeve positioned about said second cylindrical portion of said shaft when said piston is in one of its extreme positions of movement and extending into said guide cavity, said sleeve and guide cavity having cooperating guide means for preventing rotational motion of said piston relative to said body, said cam sleeve having about a one-quarter revolution cam development, and said second cylindrical portion of said shaft having a radially projecting pin engaging said cam development whereby one stroke of said piston produces about one-quarter revolution of said shaft.

References Cited in the file of this patent

UNITED STATES PATENTS

| | | |
|---|---|---|
| 368,674 | Kent | Aug. 23, 1887 |
| 623,873 | Borden | Apr. 25, 1899 |
| 951,318 | Kjeruff | Mar. 8, 1910 |
| 1,806,083 | Roberts | May 19, 1931 |
| 2,315,775 | D'Arcey | Apr. 6, 1943 |
| 2,883,144 | Kendig | Apr. 21, 1959 |
| 2,953,344 | Yancey | Sept. 20, 1960 |

FOREIGN PATENTS

| | | |
|---|---|---|
| 774,020 | Great Britain | May 1, 1957 |